US007640369B2

United States Patent
Inada et al.

(10) Patent No.: US 7,640,369 B2
(45) Date of Patent: Dec. 29, 2009

(54) PERIPHERAL DEVICE CAPABLE OF BLOCKING AND UNBLOCKING CONNECTION DETECTION

(75) Inventors: Hajime Inada, Chiryu (JP); Hirotoshi Maehira, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 170 days.

(21) Appl. No.: 11/508,961

(22) Filed: Aug. 24, 2006

(65) Prior Publication Data

US 2007/0055801 A1     Mar. 8, 2007

(30) Foreign Application Priority Data

Aug. 24, 2005   (JP)   .............................. 2005-243264

(51) Int. Cl.
G06F 3/00 (2006.01)
G06F 9/00 (2006.01)
(52) U.S. Cl. ................................ 710/8; 710/17; 710/62; 713/1; 713/100
(58) Field of Classification Search ...................... 710/8, 710/17, 62, 302; 713/1, 100
See application file for complete search history.

(56) References Cited

U.S. PATENT DOCUMENTS

| | | | | |
|---|---|---|---|---|
| 5,386,567 | A * | 1/1995 | Lien et al. ................... | 713/100 |
| 6,014,714 | A * | 1/2000 | Plyler et al. .................... | 710/8 |
| 6,292,848 | B1 * | 9/2001 | Plyler et al. .................... | 710/8 |
| 6,574,680 | B1 * | 6/2003 | Tangvald et al. .............. | 710/10 |
| 7,197,580 | B2 * | 3/2007 | Rosenbloom et al. ......... | 710/15 |
| 2002/0023179 | A1 * | 2/2002 | Stanley .......................... | 710/8 |
| 2002/0073340 | A1 * | 6/2002 | Mambakkam et al. ...... | 713/202 |
| 2003/0046674 | A1 * | 3/2003 | Gentry et al. ................ | 717/171 |
| 2003/0051069 | A1 * | 3/2003 | Iida ............................. | 709/321 |
| 2003/0158990 | A1 * | 8/2003 | Allen et al. .................. | 710/305 |
| 2004/0205396 | A1 * | 10/2004 | Wu et al. ....................... | 714/23 |
| 2005/0200889 | A1 * | 9/2005 | Oomura ..................... | 358/1.15 |
| 2006/0047859 | A1 * | 3/2006 | Cavalaris et al. .............. | 710/8 |
| 2006/0107037 | A1 * | 5/2006 | Lincoln et al. .............. | 713/155 |

FOREIGN PATENT DOCUMENTS

JP        2001-265546        9/2001

* cited by examiner

Primary Examiner—Henry W. H. Tsai
Assistant Examiner—Steven G Snyder
(74) Attorney, Agent, or Firm—Banner & Witcoff, Ltd (57) ABSTRACT

A peripheral device has a communication section for communicating with operational equipment, the operational equipment including a detecting unit configured to detect a peripheral device, and an installing unit configured to install a driver to control the peripheral device detected by the detecting unit, a first setting section configured to set a blocking state that blocks detection by the detecting unit prior to activation of the installing unit, a determining section configured to determine whether the installing unit has been activated or not, and a second setting section configured to cancel the blocking state set by the first setting section after the determining section determines that the installing unit has been activated and configured to set a permitting state in which detection by the detecting unit is permitted.

11 Claims, 10 Drawing Sheets

```
Installer

"The USB connection function of the device
side is to be enabled.
 Use the operation panel of the device
to proceed to 1-3-7 in Function Menu and display
[USB Connection Setting Menu].
 Use ten keys to input the following serial
number.
  Serial No.:84462271
 The USB connection function of the device
is enabled after the input.
 Make connection with the device with a USB
cable."
```

PERIPHERAL DEVICE CAPABLE OF BLOCKING AND UNBLOCKING CONNECTION DETECTION

CROSS-REFERENCE TO RELATED APPLICATIONS

This Nonprovisional application claims priority under 35 U.S.C. §119(a) on Patent Application No. 2005-243264 filed in Japan on Aug. 24, 2005, the entire contents of which are hereby incorporated by reference.

BACKGROUND

The present invention relates to a peripheral device which can install an intended driver normally.

A personal computer (which will be hereinafter referred to as a "PC") having a plug and play function (which will be hereinafter referred to as a "PnP function") is known conventionally. The PnP function is a function used in a case where a peripheral device such as a printer or a scanner is connected with a PC, so as to detect the connected peripheral device and set the peripheral device automatically to a usable state without any special manipulation by the user. A computer having the PnP function is disclosed in, for example, Japanese Patent Application Laid-Open No. 2001-265546.

On the other hand, a PC having the PnP function does not hold all device drivers (which will be hereinafter referred to as "drivers") corresponding to the respective peripheral devices. When a CD-ROM or a floppy disk (registered trademark) storing a driver is attached to a peripheral device, the driver needs to be installed by an installer corresponding to the PnP function.

SUMMARY

However, in a case where a driver is installed by an installer corresponding to the PnP function, there is a problem that a connected peripheral device may be detected by the PnP function when the peripheral device is connected with a PC before the installer is activated and an unintended driver may be installed, which results in the occurrence of an install error.

An object is to provide a peripheral device which can install an intended driver normally.

In order to achieve the above object, a peripheral device comprises: a communication section for communicating with an operational equipment which has a detecting unit for automatically detecting a peripheral device to communicate with and an installing unit for installing a driver to control a peripheral device detected by the detecting unit; a first setting section for setting a blocking state in which detection by the detecting unit before the installing unit is activated is blocked; a determining section for determining whether the installing unit has been activated or not; and a second setting section for canceling the blocking state set by the first setting section after it is determined by the determining section that the installing unit has been activated and setting a permitting state in which detection by the detecting unit is permitted.

With the peripheral device wherein a blocking state in which detection by the operational equipment is blocked is set by the first setting section before the installing unit is activated, it is possible to prevent a peripheral device from being detected by the operational equipment before the installing unit is activated and to prevent an unintended driver from being installed. On the other hand, when the installing unit has been activated, the blocking state is cancelled by the second setting section and a permitting state in which detection of the peripheral device by the operational equipment is permitted is set, bringing about an effect that an intended driver can be installed normally in accordance with the installing unit after the installing unit is activated.

The above and further objects and features of the invention will more fully be apparent from the following detailed description with accompanying drawings.

DETAILED DESCRIPTION OF THE EXEMPLARY EMBODIMENTS

Figure 1:
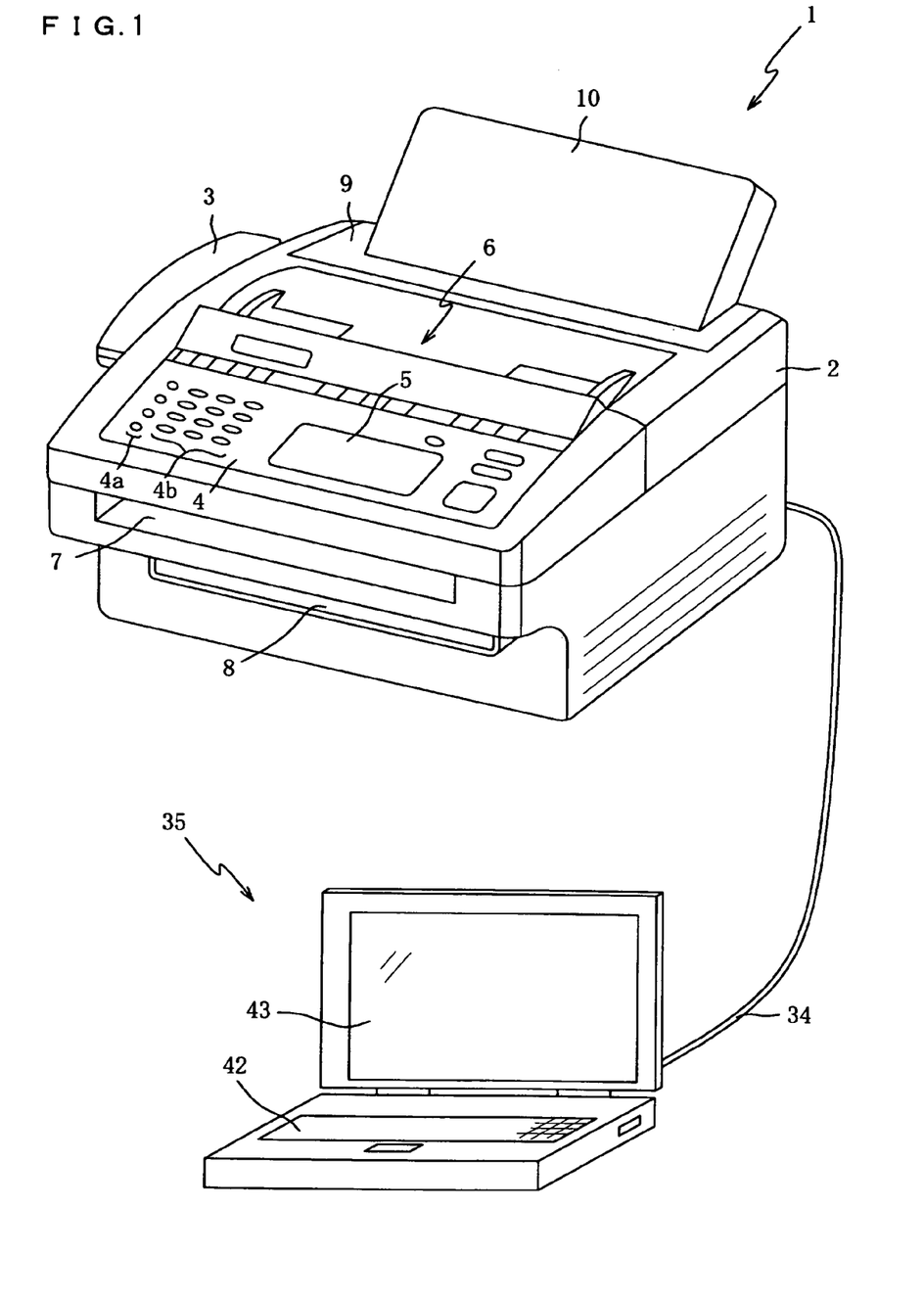
FIG. 1 is an external perspective view showing a state in which a PC is connected with a multi-function peripheral device.

The following description will explain the present invention in detail with reference to the drawings illustrating some embodiments thereof. FIG. 1 is an external perspective view showing a state in which a PC 35 is connected with a multi-function peripheral device 1 which functions as a peripheral device. The multi-function peripheral device 1 has a facsimile function, a telephone function and a copy function, comprises a USB (Universal Serial Bus) interface 30a (see FIG. 2), which will be explained later, and is constructed to be able to communicate with the PC 35, which functions as an operational equipment, via a USB cable 34.

A telephone receiver 3 is attached to a side part of a body 2 of the multi-function peripheral device 1. The telephone receiver 3 is put on a hook, which is not illustrated in the figure, provided at the body 2 unless a call is made, and is held up from the hook and used during a call. An operation panel 4 is provided at a front part of the upper face of the body 2. Command input keys 4a for inputting commands, input keys 4b for inputting numerals, characters or the like and an LCD 5 are provided on the operation panel 4 in this order from the telephone receiver 3 side (the left side in the figure). It should be noted that input of the serial number (S401 in FIG. 4), which will be explained later, is achieved by manipulating the command input keys 4a and the input keys 4b.

An original inlet 6 is provided behind the operation panel 4. An original copy is inserted into the original inlet 6 with the original copy side thereof facing downward, and is taken out from an original outlet 7, which is provided below the operation panel 4 on the front face of the body 2, after a reading operation. A recording paper holder mounting part 9 is provided behind the original inlet 6 and a recording paper holder 10 on which a plurality of recording paper sheets can be piled and placed is attached to the recording paper holder mounting part 9 so as to be detachable. Recording paper which is supplied from the recording paper holder 10 and used for printing is taken out from a recording paper outlet 8 which is provided below the original outlet 7.

A connection aperture 32 (see FIG. 6B) into which one end side of the USB cable 34 is to be plugged is provided at the back face of the body 2, so that a connector 31 (see FIG. 6B) to be connected with the one end side of the USB cable 34 is exposed from the connection aperture 32. When the one end side of the USB cable 34 is connected with the connector 31 and, at the same time, the other end side of the USB cable 34 is connected with the PC 35, the multi-function peripheral device 1 and the PC 35 come to be able to communicate with each other via the USB cable 34.

In the meantime, the PC 35 is a device for controlling the multi-function peripheral device 1 and comprises a keyboard 42 and an LCD 43. The PC 35 also comprises a USB interface 30b (see FIG. 2), which will be explained later, capable of being connected with the USB cable 34 and is constructed to be able to communicate with the multi-function peripheral device 1 via the USB cable 34.

Figure 2:
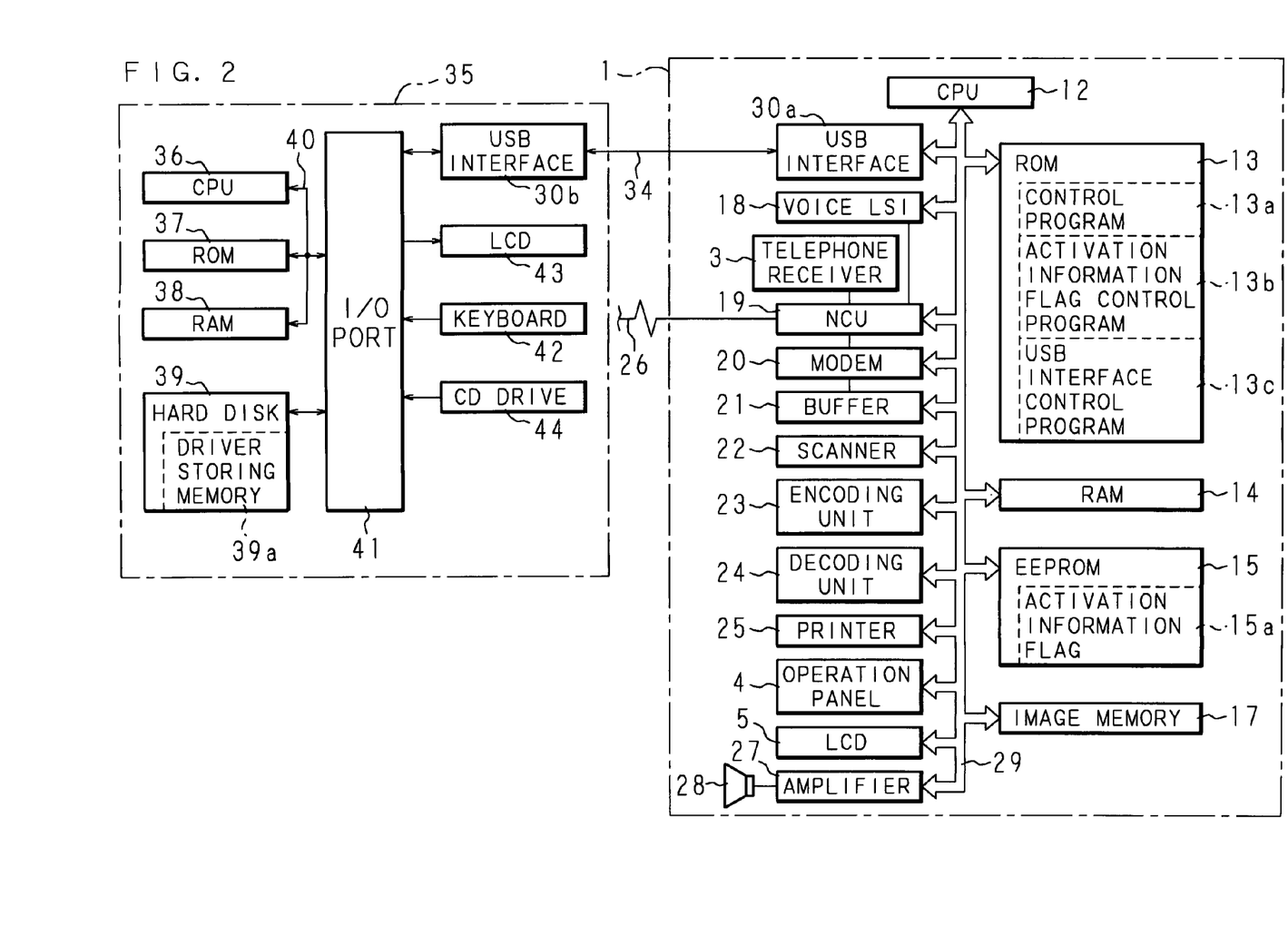
FIG. 2 is a block diagram showing the electrical structure of the multi-function peripheral device and the PC.

FIG. 2 is a block diagram showing the electrical structure of the multi-function peripheral device 1 and the PC 35. Besides the above structure, the multi-function peripheral device 1 comprises a CPU 12, a ROM 13, a RAM 14, an EEPROM 15, an image memory 17, a voice LSI 18, a network control unit 19 (which will be hereinafter referred to simply as an "NCU 19"), a modem 20, a buffer 21, a scanner 22, an encoding unit 23, a decoding unit 24, a printer 25, an amplifier 27, a speaker 28 and the USB interface 30a, which are connected with each other via a bus line 29.

The CPU 12 controls the respective units connected by the bus line 29 in accordance with various signals transmitted and received via the NCU 19 and executes data communication such as a facsimile operation or a telephone operation. The ROM 13, which is a non-rewritable memory for storing a control program and the like to be executed by the multi-function peripheral device 1, stores a control program 13a, an activation information flag control program 13b and a USB interface control program 13c.

Figure 4:
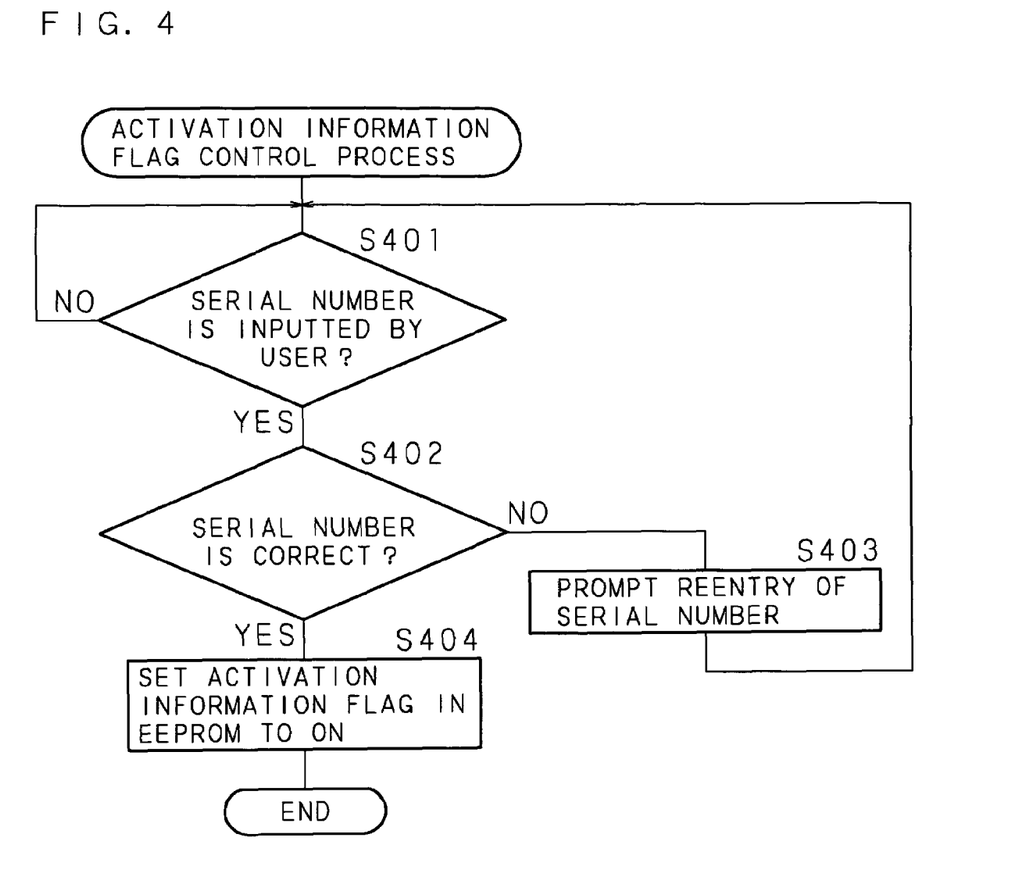
FIG. 4 is a flow chart of an activation flag control process.
Figure 5:
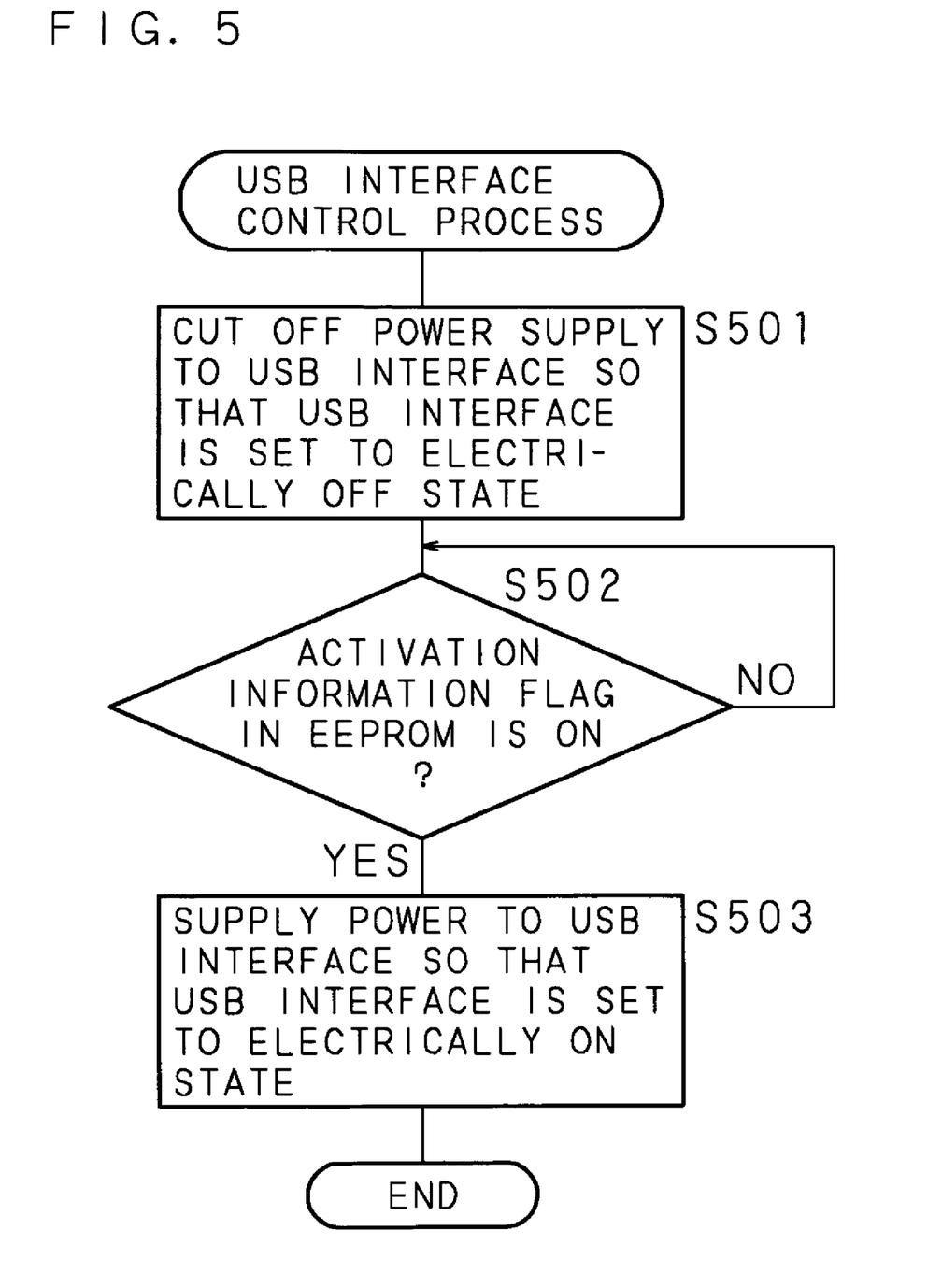
FIG. 5 is a flow chart of a USB interface control process.

The control program 13a is a program for controlling an operation relating to a facsimile operation or a telephone operation to be executed by the multi-function peripheral device 1 or an operation corresponding to the PnP function. The activation information flag control program 13b is a program for controlling ON/OFF of an activation information flag 15a, which will be explained later, and an activation information flag control process shown in FIG. 4 is executed in accordance with this program. The USB interface control program 13c is a program for controlling the power supply to the USB interface 30a and a USB interface control process shown in FIG. 5 is executed in accordance with this program.

The RAM 14 is a memory for temporarily storing various data. The EEPROM 15, which is a rewritable and nonvolatile memory, holds data stored therein even after power thereof is turned off. The EEPROM 15 is provided with the activation information flag 15a. The activation information flag 15a is a flag for indicating whether an installer for installing a driver for the multi-function peripheral device 1 into the PC 35 has been activated or not and is controlled in accordance with the activation information flag control program 13b.

In particular, the activation information flag 15a is set to ON while the installer is activated, or set to OFF before the installer is activated. In the present embodiment, it is assumed that the activation information flag 15a is set to OFF at the factory, and then set to ON when the user inputs a serial number of the multi-function peripheral device 1 using the input keys 4b or the like.

The setting status of the activation information flag 15a is monitored by the CPU 12 in accordance with the USB interface control program 13c described above, so that the power supply to the USB interface 30a is cut off when the activation information flag 15a is OFF and power is supplied to the USB interface 30a when the activation information flag 15a is ON.

The image memory 17 is a memory for storing image data and is constituted of a mass DRAM. The voice LSI 18 converts an analog voice signal received by the NCU 19 into a digital voice signal, and converts a digital voice signal generated inside the multi-function peripheral device 1 into an analog voice signal and outputs the analog voice signal to the NCU 19. The NCU 19 performs line control and the multi-function peripheral device 1 is connected with a telephone line 26 via the NCU 19.

The modem 20 modulates, demodulates and transmits image data or mail data, and transmits and receives various procedure signals for transmission control. The buffer 21 temporally stores encoded facsimile data to be transmitted to and received from another facsimile machine and image data of an original copy read by the scanner 22.

The scanner 22 reads an image of an original copy inserted into the original inlet 6. The encoding unit 23 encodes the original image read by the scanner 22. The decoding unit 24 reads out received data which is stored in the buffer 21 and decodes the data, and the decoded data is printed on recording paper by the printer 25. The amplifier 27 rings the speaker 28 connected with the amplifier 27 and outputs the phone ring or the like.

The USB interface 30a is a known circuit which enables communication with the PC 35. The USB interface 30a comprises the connector 31 (see FIG. 6B) which can be connected with one end side of the USB cable 34 which has two signal lines of D+ and D−, a power wire and a ground wire. When the USB interface 30a and the USB interface 30b at the PC 35 side, which will be explained later, are connected physically with each other via the USB cable 34 and, at the same time, power is supplied to the USB interface 30a, connection that the multi-function peripheral device 1 has been connected is detected at the PC 35 side.

That is, connection is not detected at the PC 35 side unless power is supplied to the USB interface 30a even when the USB interface 30a and the USB interface 30b at the PC 35 side are connected physically with each other via the USB cable 34.

In the meantime, the PC 35 comprises a CPU 36, a ROM 37, a RAM 38, a hard disk 39, an I/O port 41, a CD drive 44 and the USB interface 30b. The CPU 36 controls the respective units connected by a bus line 40 based on fixed values or programs stored in the ROM 37 or various signals transmitted and received via the USB interface 30b. The ROM 37 is a non-rewritable memory for storing a control program and the like to be executed by the PC 35. The RAM 38 is a memory for temporarily storing various data.

The hard disk 39, which is a rewritable and nonvolatile memory, is provided with a driver storing memory 39a for storing a driver of various peripheral devices including the multi-function peripheral device 1. The driver is recorded on an information memory product such as a CD-ROM before shipment, for example, and is installed by an install process, which will be explained later, automatically when the CD-ROM is set in the CD drive 44.

The hard disk 39 also stores an OS (Operation System) as a basic software. When various peripheral devices including the multi-function peripheral device 1 are connected with the PC 35, this OS, which has the PnP function, detects connection that the various peripheral devices have been connected, makes configuration between itself and the connected various peripheral devices, then activates a proper driver corresponding to the connected various peripheral devices and sets the connected peripheral devices to a usable state.

The USB interface 30b is a known circuit which enables communication with USB devices including the multi-function peripheral device 1 and is constructed to be able to be connected with the USB cable 34. It should be noted that the CPU 36, the ROM 37 and the RAM 38 described above are connected with each other via the bus line 40 and the bus line 40 is connected with the I/O port 41. Besides the bus line 40, the I/O port 41 is connected with the hard disk 39, the keyboard 42, the LCD 43, the CD drive 44 and the USB interface 30b.

Figure 3A:
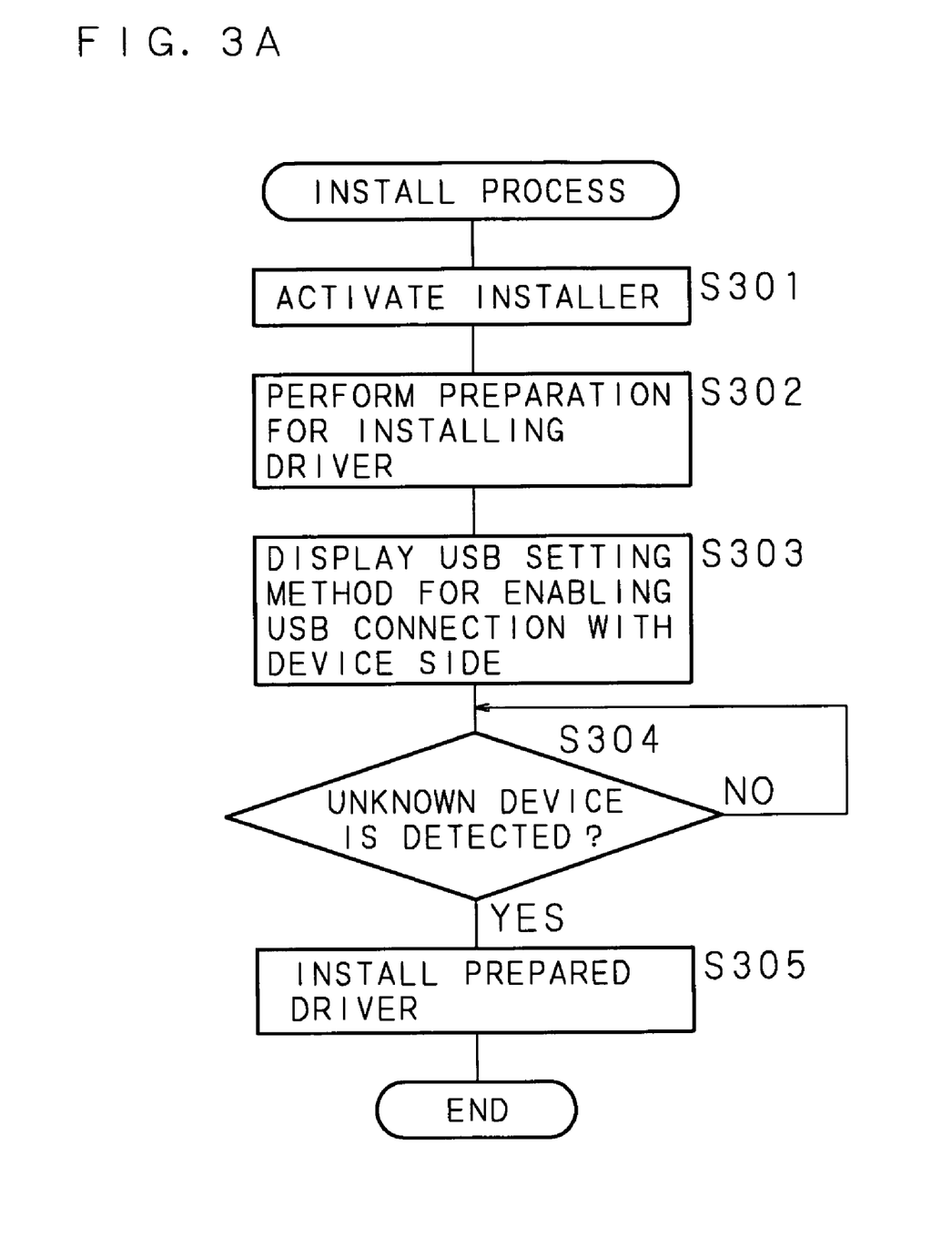
FIG. 3A is a flow chart of an install process.
Figure 3B:
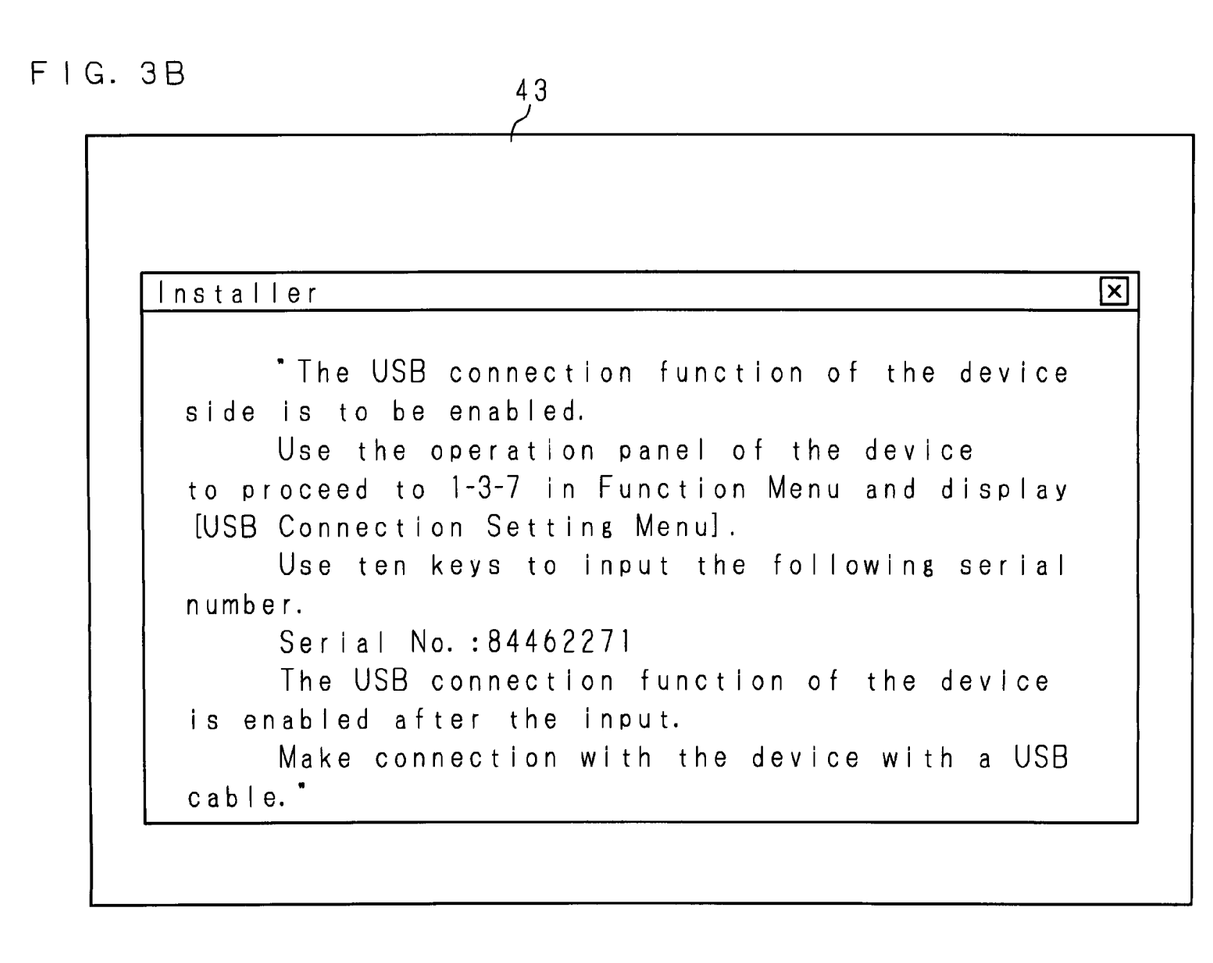
FIG. 3B is a view showing a display screen during the install process.

Next, the following description will explain an install process for installing a driver for the multi-function peripheral device 1 into the PC 35 with reference to FIGS. 3A and 3B. FIG. 3A is a flow chart showing an install process and FIG. 3B is a view showing the display screen to be displayed on the LCD 43 of the PC 35 during the install process.

In the install process, an installer is activated first (S301). The installer is a program for installing a driver automatically, and is activated automatically by setting a CD-ROM storing a driver in the CD drive 44 in the present embodiment. When the installer is activated (S301), preparation for installing the driver is performed (S302). In particular, the driver stored in the CD-ROM is written in the driver storing memory 39a. Next, a USB setting method for enabling the USB connection with the device side (the multi-function peripheral device 1 in the present embodiment) is displayed on the LCD 43 (S303).

In particular, as shown in FIG. 3B, displayed is:

"The USB connection function of the device side is to be enabled.

Use the operation panel of the device to proceed to 1-3-7 in Function Menu and display [USB Connection Setting Menu].

Use ten keys to input the following serial number.

Serial No.: 84462271

The USB connection function of the device is enabled after the input.

Make connection with the device with a USB cable."

It should be noted that the USB connection function of the multi-function peripheral device 1 is enabled when the user manipulates the command input keys 4a and the input keys 4b of the multi-function peripheral device 1 in accordance with the display, and the driver is installed into the PC 35 according to the procedure of the prior PnP function after the multi-function peripheral device 1 and the PC 35 are connected with each other via the USB cable 34.

That is, whether an unknown device has been detected or not is determined (S304), and the process of S304 is executed repeatedly when no unknown device is detected (S304: No) or the driver prepared in the process of S302 is installed when any unknown device has been detected (S304: Yes). That is, the driver prepared in the process of S302 is set to a usable state (S305) and this process is terminated.

Next, the following description will explain the activation information flag control process with reference to a flow chart shown in FIG. 4. The activation information flag control process is a process for controlling ON/FF of the activation information flag 15a and is executed in accordance with the activation information flag control program 13b. This process is executed after the user instructs display of [USB Connection Setting Menu] in accordance with the process of S303 in FIG. 3A.

In the activation information flag control process, whether the user has inputted the serial number or not is determined first (S401). That is, whether the user has inputted the serial number in accordance with the instruction displayed on the LCD 43 of the PC 35 in S303 of FIG. 3A is determined. The process of S401 is executed repeatedly when the serial number has not been inputted (S401: No), or whether the inputted serial number is correct or not is determined (S402) when the serial number has been inputted (S401: Yes).

When the inputted serial number is incorrect (S402: No), reentry of the serial number is prompted (S403). Displayed on the LCD 5 is, for example, a message of "The inputted serial number is improper. Reenter the correct serial number." On the other hand, when the inputted serial number is correct (S402: Yes), the activation information flag 15a is set to ON (S404) and this process is terminated.

Next, the following description will explain the USB interface control process with reference to a flow chart shown in FIG. 5. The USB interface control process is a process for controlling the power supply to the USB interface 30a and is executed in accordance with the USB interface control program 13c. It should be noted that this process is executed when power of the multi-function peripheral device 1 is turned on.

In the USB interface control process, power supply to the USB interface 30a is cut off first, so that the USB interface 30a is set to an electrically OFF state (S501). That is, as described above, connection that the multi-function peripheral device 1 has been connected is not detected at the PC 35 unless power is supplied to the USB interface 30a even when the USB interface 30a and the USB interface 30b of the PC 35 side are connected physically with each other via the USB cable 34.

Next, whether the activation information flag 15a is ON or not is determined (S502), and the process of S502 is executed repeatedly when the activation information flag 15a is OFF (S502: No). When the activation information flag 15a is ON (S502: Yes), power is supplied to the USB interface 30a, so that the USB interface 30a comes into an electrically ON state (S503), and this process is terminated.

As described above, power is supplied to the USB interface 30a at the multi-function peripheral device 1 when the activation information flag 15a is ON, and the activation information flag 15a is set to ON when the user inputs a correct serial number at the process of S402 in FIG. 4 in accordance with the process of S303 in FIG. 3A. On the other hand, at the PC 35 side, since the installer is activated in the process of S301 and S302 in FIG. 3A and preparation for installing the driver has been already made before the process of S303 in FIG. 3A, power is supplied to the USB interface 30a at the multi-function peripheral device 1 after all after the installer is activated (after preparation for installing the driver is made).

As explained above, with the multi-function peripheral device 1, power is supplied to the USB interface 30a and the USB interface 30a is set to an electrically ON state after the installer is activated at the PC 35 side (after preparation for installing the driver is made). Accordingly, even when the multi-function peripheral device 1 and the PC 35 are connected physically with each other via the USB cable 34 before the installer is activated (before preparation for installing the driver is made), connection is not detected at the PC 35 side and it is possible to prevent an unintended driver from being installed.

That is, since connection is detected at the PC 35 side after the installer is activated at the PC 35 side (after preparation for installing the driver is made), it is possible to install an intended driver normally.

Moreover, since a state in which connection is detected at the PC 35 side and a state in which connection is not detected are controlled by an electrical process of supplying or not supplying power to the USB interface 30$a$, there is no necessity to add a new component and it is possible to lower the manufacturing costs of the multi-function peripheral device 1.

Next, the following description will explain a multi-function peripheral device 100 according to the second embodiment with reference to FIGS. 6 to 9. It should be noted that like codes are used to refer to the structure of the multi-function peripheral device 100 according to the second embodiment in common with the structure of the multi-function peripheral device 1 according to the first embodiment described above, and explanation thereof is omitted. FIGS. 6A and 6B show the back face side of the multi-function peripheral device 100 according to the second embodiment. In particular, FIG. 6A is an external perspective view showing a state in which the connection aperture 32 is shut by a shutter 50 and FIG. 6B is an external perspective view showing a state in which the connection aperture 32 is not shut by the shutter 50.

Figure 6A:
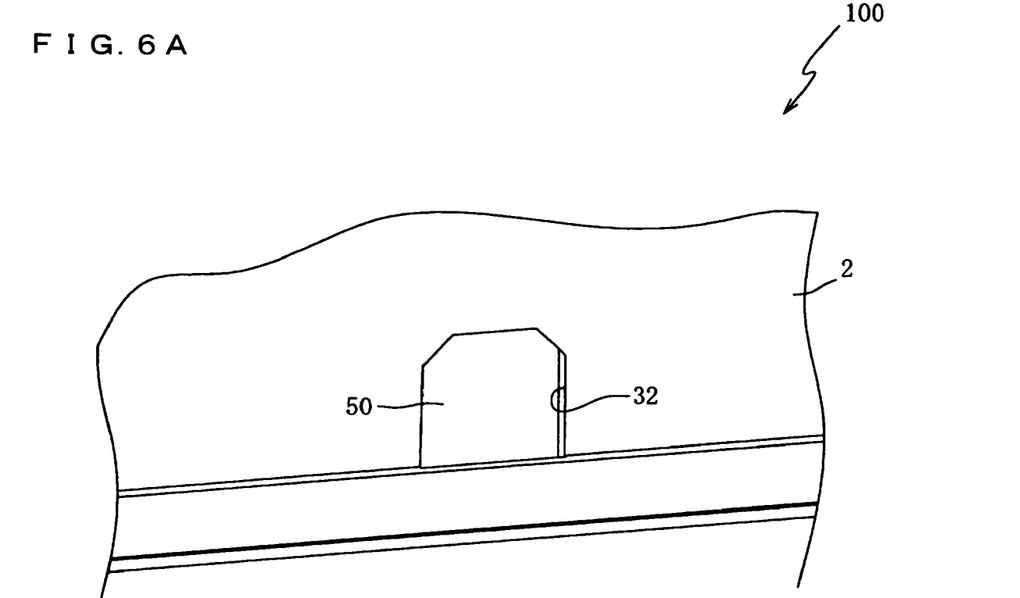
FIG. 6A is an external perspective view showing a state in which a connection aperture is shut by a shutter.
Figure 6B:
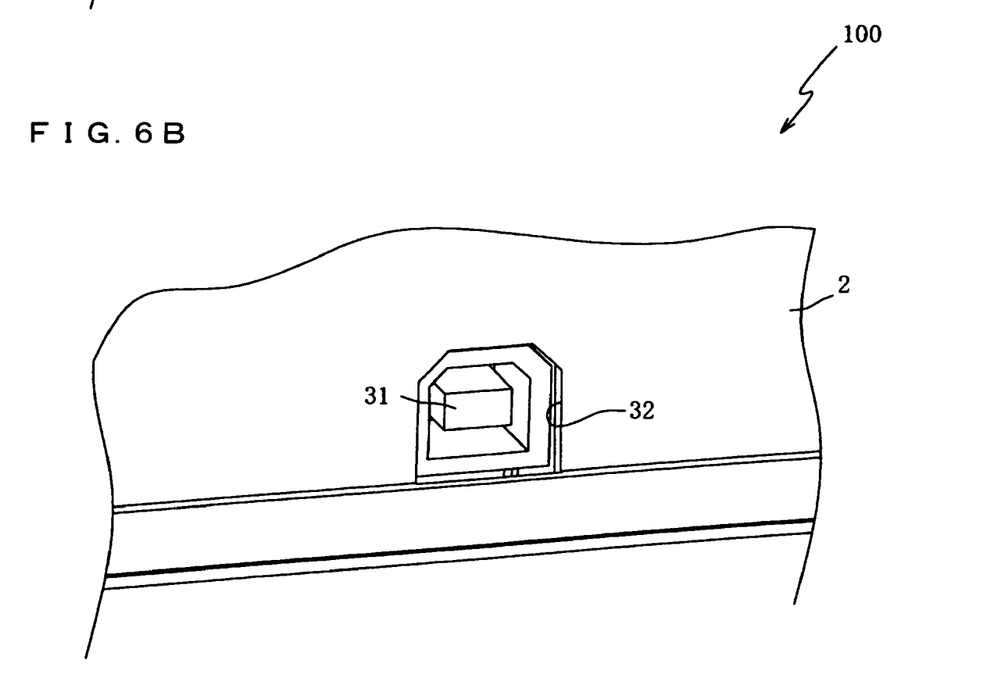
FIG. 6B is an external perspective view showing a state in which the connection aperture is not shut by the shutter.

The multi-function peripheral device 100 according to the second embodiment comprises the shutter 50 for shuttering and opening the connection aperture 32. The multi-function peripheral device 100 is constructed to set one end side of the USB cable 34 to a state to be able to be connected with the connector 31 and to a state to be not connectable by shuttering or opening the connection aperture 32 by the shutter 50.

That is, when the connection aperture 32 is shut by the shutter 50 as shown in FIG. 6A, the connector 31 is hidden by the shutter 50 and the one end of the USB cable 34 cannot be connected with the connector 31.

On the other hand, when the connection aperture 32 is not shut by the shutter 50 as shown in FIG. 6B, the connector 31 is exposed from the connection aperture 32 and the one end of the USB cable 34 can be connected with the connector 31.

Accordingly, by setting the connection aperture 32 to a state to be shut by the shutter 50 as shown in FIG. 6A before the installer is activated (before preparation for installing the driver is made), it is possible to prevent the one end side of the USB cable 34 from being connected with the connector 31 before the installer is activated (before preparation for installing the driver is made) and to prevent an unintended driver from being installed.

In the meantime, by setting the connection aperture 32 to a state to be opened by the shutter 50 is opened so that the connector 31 is exposed to outside as shown in FIG. 6B after the installer is activated (after preparation for installing the driver is made), the USB cable 34 comes to be able to be connected with the connector 31 after the installer is activated (after preparation for installing the driver is made) and it is possible to install an intended driver normally.

Figure 7A:
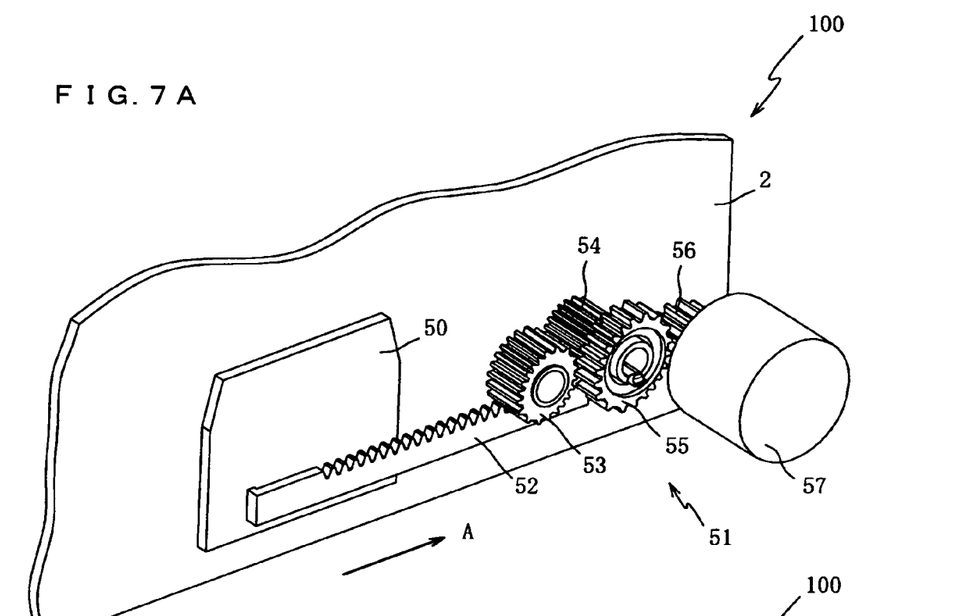
FIG. 7A is a perspective view showing the internal structure in the state shown in FIG. 6A.
Figure 7B:
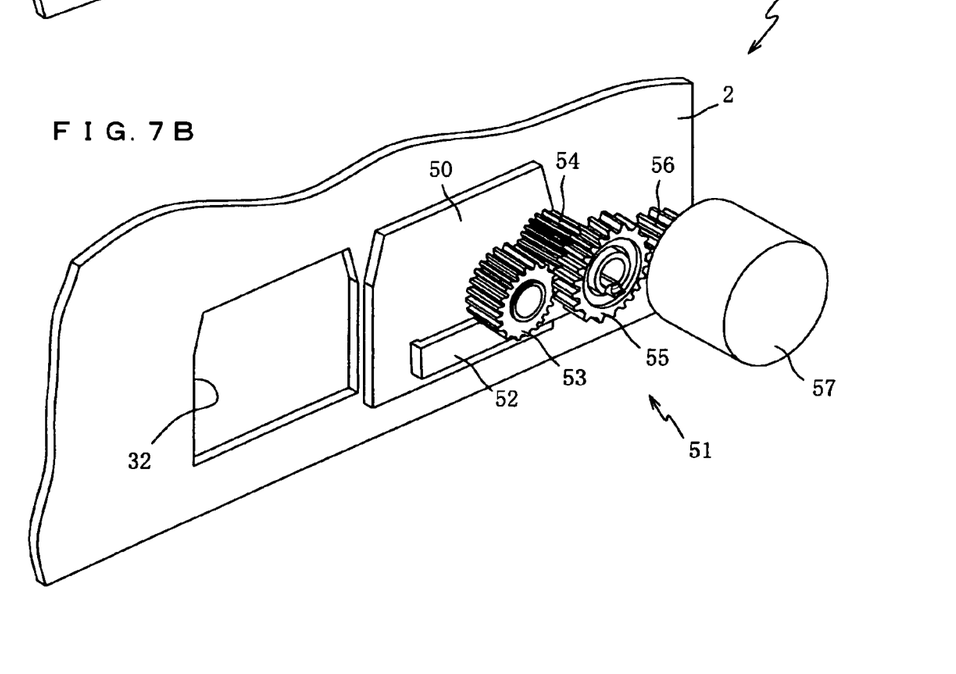
FIG. 7B is a perspective view showing the internal structure in the state shown in FIG. 6B.

Next, the following description will explain a drive mechanism 51 for driving the shutter 50 with reference to FIGS. 7A and 7B. FIG. 7A is a perspective view showing the internal structure corresponding to the state shown in FIG. 6A (state in which the connection aperture 32 is shut by the shutter 50) and FIG. 7B is a perspective view showing the internal structure corresponding to the state shown in FIG. 6B (state in which the connection aperture 32 is not shut by the shutter 50).

As shown in FIGS. 7A and 7B, the drive mechanism 51 comprises: a rack 52 connected with the shutter 50; a pinion gear 53 meshed with the rack 52; a spline shaft 54 meshed with the pinion gear 53; a reduction gear 55 attached to the spline shaft 54; a driving gear 56 meshed with the reduction gear 55; and a motor 57 which has a motor shaft connected with the driving gear 56.

With the drive mechanism 51, when the motor 57 for the shutter is driven while the shutter 50 is in a state to shut the connection aperture 32 as shown in FIG. 7A, the driving force is transmitted via the driving gear 56, the reduction gear 55, the spline shaft 54 and the pinion gear 53 to the rack 52, so that the shutter 50 connected with the rack 52 moves in the direction denoted by the arrow A in FIG. 7A, the connection aperture 32 is opened as shown in FIG. 7B and the connector 31 is exposed to outside (see FIG. 6B). Accordingly, the one end side of the USB cable 34 can be connected with the connector 31.

Figure 8:
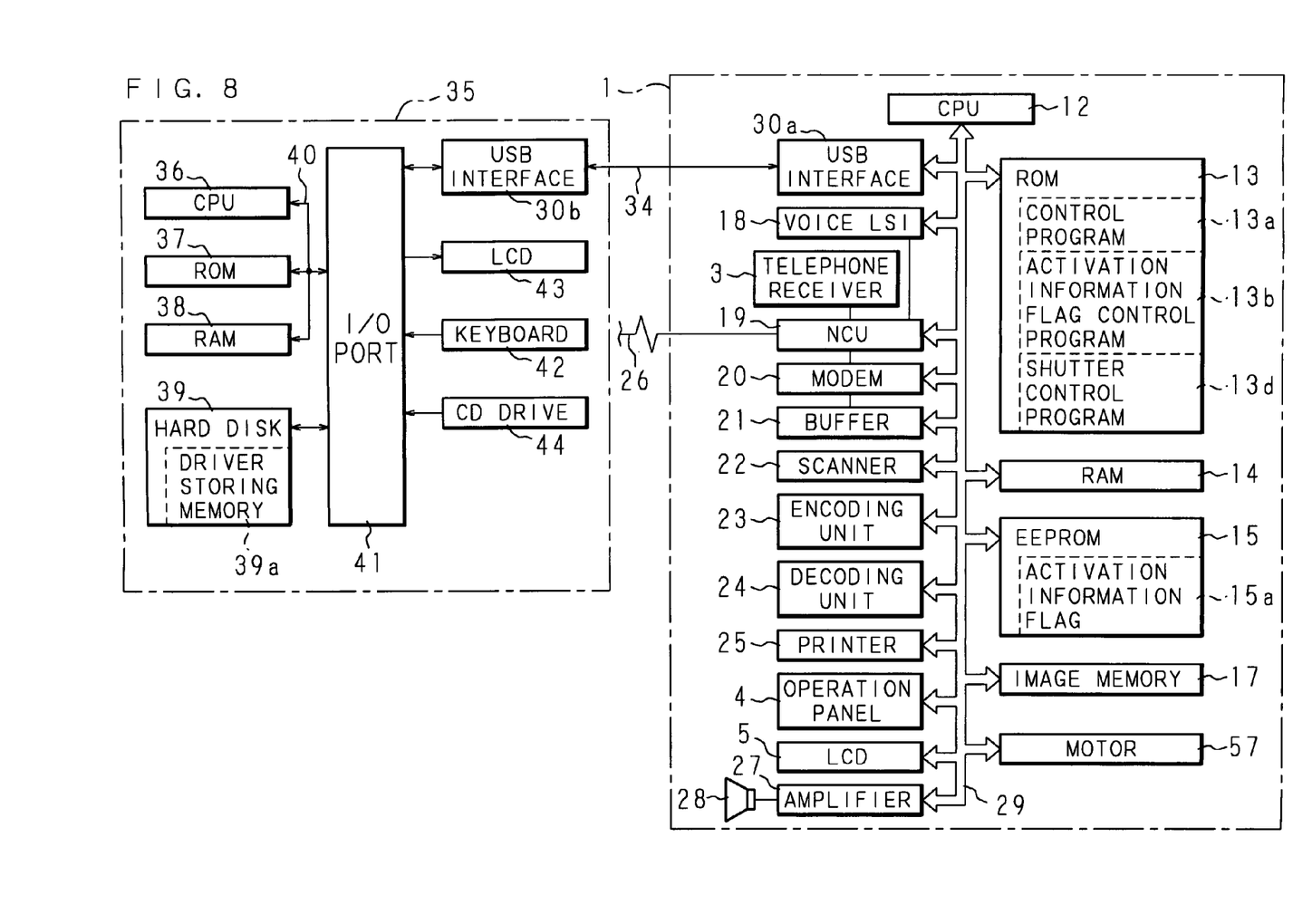
FIG. 8 is a block diagram showing the electrical structure of a multi-function peripheral device according to the second embodiment and a PC.

FIG. 8 is a block diagram showing the electrical structure of the multi-function peripheral device 100 according to the second embodiment and the PC 35. Similar to the multi-function peripheral device 1 according to the first embodiment, the multi-function peripheral device 100 according to the second embodiment comprises the activation information flag control program 13$b$ in the ROM 13 and the activation information flag 15$a$ in the EEPROM 15.

Similar to the above description, the activation information flag control program 13$b$ is a program for controlling ON/OFF of the activation information flag 15$a$ and a program for executing the activation information flag control process shown in FIG. 4, and the activation information flag 15$a$ is a flag for indicating whether an installer for installing a driver for the multi-function peripheral device 100 into the PC 35 has been activated or not.

In the meantime, the multi-function peripheral device 100 according to the second embodiment is different from the multi-function peripheral device 1 according to the first embodiment in that the multi-function peripheral device 100 comprises a shutter control program 13$d$, in place of the USB interface control program 13$c$ provided in the multi-function peripheral device 1 according to the first embodiment, and the drive mechanism 51 described above. The shutter control program 13$d$ is a program for controlling the drive of the shutter 50 and a shutter control process shown in FIG. 9, which will be explained later, is executed in accordance with the shutter control program 13$d$.

Figure 9:
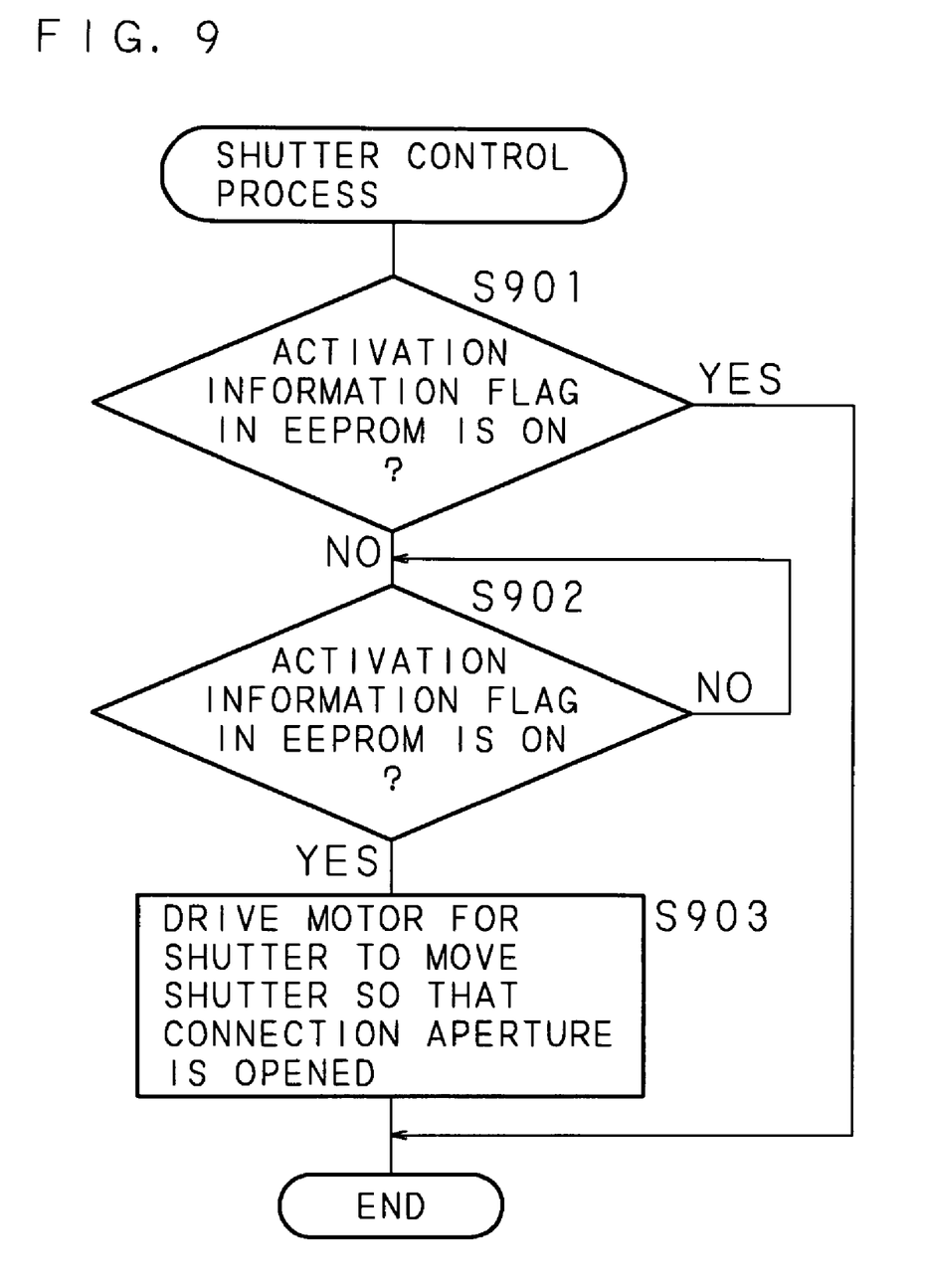
FIG. 9 is a flow chart of a shutter control process according to the second embodiment.

Next, the following description will explain the shutter control process to be executed in the multi-function peripheral device 100 according to the second embodiment with reference to a flow chart shown in FIG. 9.

The shutter control process is a process for controlling the drive of the shutter 50 in accordance with the state of the activation information flag 15$a$ and is executed in accordance with the shutter control program 13$d$. It should be noted that this process is executed when power of the multi-function peripheral device 100 is turned on, and the shutter 50 is set to a state to shut the connection aperture 32 as shown in FIG. 6A before shipment.

In the shutter control process, whether the activation information flag 15$a$ of the EEPROM 15 is ON or not is determined first (S901) and this process is terminated when the activation information flag 15$a$ is ON (S901: Yes). On the other hand, when the activation information flag 15$a$ is OFF (S901: No), whether the activation information flag 15$a$ is ON or not is determined again (S902). When the activation information flag 15$a$ is OFF (S902: No), the process of S902 is executed repeatedly. When the activation information flag 15a is ON (S902: Yes), the motor 57 for the shutter is driven to move the shutter 50 so that the connection aperture 32 is opened (S903) and this process is terminated.

As described above, in the multi-function peripheral device 100 according to the second embodiment, the connection aperture 32 is opened so that the connector 31 is exposed to outside and the connector 31 and the one end side of the USB cable 34 come to be able to be connected with each other when the activation information flag 15a is ON and the activation information flag 15a is set to ON when the user inputs a correct serial number in the process of S402 in FIG. 4 in accordance with the process of S303 in FIG. 3A. On the other hand, at the PC 35 side, since the installer is activated and preparation for installing the driver has been already made in the process of S301 and S302 in FIG. 3A before the process of S303 in FIG. 3A, the connector 31 and the one end side of the USB cable 34 come to be able to be connected with each other in the multi-function peripheral device 100 after all after the installer is activated (after preparation for installing the driver is made).

As explained above, with the multi-function peripheral device 100 according to the second embodiment, the connector 31 and the one end side of the USB cable 34 come to be able to be connected with each other after the installer is activated at the PC 35 side (after preparation for installing the driver is made). Accordingly, the multi-function peripheral device 100 and the PC 35 cannot be connected physically with each other via the USB cable 34 before the installer is activated (before preparation for installing the driver is made) and connection is not detected at the PC 35 side after all before the installer is activated (before preparation for installing the driver is made), and it is possible to prevent an unintended driver from being installed.

That is, since the connector 31 and the one end side of the USB cable 34 come to a connectable state after the installer is activated at the PC 35 side (after preparation for installing the driver is made), it is possible to install an intended driver normally. Moreover, the necessity of any manipulation (in particular, manipulation instructed by the PC 35 at S303 in FIG. 3A for the purpose of connecting the connector 31 and the one end side of the USB cable 34 with each other can be appealed sensuously to the user.

Although the present invention has been explained with reference to some embodiments, the present invention is not limited to the above embodiments at all and it will be easily understood that various modification or changes may be made without departing from the scope of the present invention.

Regarding the multi-function peripheral devices 1 and 100 described above, although the above description has explained a case of installing a driver, a method of setting the USB connection impossible may be displayed on the PC 35 in order to uninstall the driver, and the activation flag 15a in an ON state may be set to an OFF state when the user manipulates the multi-function peripheral devices 1 and 100 in accordance with the setting method. In such a case, similarly to the above description, it is possible to prevent an unintended driver from being installed when the driver is installed again.

Moreover, regarding the multi-function peripheral device 100 according to the second embodiment described above, although the above description has explained a case where the connection aperture 32 is shut or opened by the shutter 50 which slides laterally with respect to the connection aperture 32, the structure described above is not necessary as long as the one end side of the USB cable 34 and the connector 31 can be set to a connectable state and a non-connectable state. For example, the shutter 50 may be slid up and down with respect to the connection aperture 32, the shutter 50 may be located not inside the device but on the outer surface thereof, or the connector 31 itself may be constructed to be slidable without providing the shutter 50.

Moreover, regarding the PC 35 according to the above embodiments, although the description has explained a case of inputting a serial number of a device as a USB setting method for enabling USB connection, the USB setting method is not limited to this method and may be a method of inputting a predetermined password in place of a serial number or a method of pressing a predetermined operation key (e.g. the ten key "0") for some time.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A peripheral device comprising:
a communication section configured to communicate with operational equipment, the operational equipment which has a detecting unit configured to automatically detect the peripheral device and which has an installing unit configured to install a driver to control the peripheral device detected by the detecting unit;
a first setting section configured to set a blocking state that blocks detection by the detecting unit prior to activation of the installing unit;
a determining section configured to determine whether the installing unit has been activated or not;
a second setting section configured to cancel the blocking state set by the first setting section after the determining section determines that the installing unit has been activated and configured to set a permitting state in which detection by the detecting unit is permitted;
an input section configured to input activation completion information indicating that the installing unit has been activated, the activation completion information being information which is outputted by the operational equipment when the installing unit is activated; and
a storing section configured to store information indicating whether the activation completion information has been inputted by the input section or not,
wherein the determining section is configured to determine whether the installing unit has been activated or not based on information stored in the storing section.

2. The peripheral device according to claim 1,
wherein upon power being supplied to the communication section, the peripheral device is available to be detected by the detecting unit,
wherein the first setting section is configured to set the blocking state in which power is cut off from being supplied to the communication section, and
wherein the second setting section is configured to set the permitting state in which power is supplied to the communication section.

3. The peripheral device according to claim 1, wherein
the communication section has a connector to be connected with one end side of a communication cable to be connected with the operational equipment,
the first setting section sets the blocking state in which the connector and the one end side of the communication cable cannot be connected with each other, and the second setting section sets the permitting state in which the connector and the one end side of the communication cable can be connected with each other.

4. The peripheral device according to claim 3, wherein the connector is a connector for a USB cable.

5. The peripheral device according to claim 3, further comprising:
- a connection aperture which is provided at a case so as to connect the connector located inside the case with the one end side of the communication cable;
- a shutter which can shut at least a part of the connection aperture; and
- a drive mechanism configured to drive the shutter,
- wherein the first setting section drives the drive mechanism to set the shutter at a position for which the connector and the one end side of the communication cable cannot be connected with each other, and
- the second setting section drives the drive mechanism to set the shutter at a position for which the connector and the one end side of the communication cable can be connected with each other.

6. The peripheral device according to claim 5, wherein the drive mechanism has a rack and pinion mechanism.

7. A method for controlling a peripheral device comprising:
- communicating via a communication section with operational equipment, the operational equipment including a detecting unit configured to automatically detect the peripheral device and an installing unit configured to install a driver to control the peripheral device detected by the detecting unit;
- setting a blocking state that blocks detection by the detecting unit prior to activation of the installing unit;
- determining whether the installing unit has been activated or not;
- canceling the blocking state after determining that the installing unit has been activated and setting a permitting state in which detection by the detecting unit is permitted;
- inputting activation completion information indicating that the installing unit has been activated, the activation completion information being information which is outputted by the operational equipment when the installing unit is activated; and
- storing information indicating whether the activation completion information has been inputted or not;
- wherein the determining section is configured to determine whether the installing unit has been activated or not based on information stored.

8. The method according to claim 7,
wherein upon power being supplied, the peripheral device is available to be detected by the detecting unit,
wherein, in the blocking state, power is not supplied to the communication section, and
wherein, in the permitting state, power is permitted to be supplied to the communication section.

9. The method according to claim 7,
wherein the peripheral device has a connector to be connected with one end side of a communication cable to be connected with the operational equipment,
wherein, when in the blocking state, the connector and the one end side of the communication cable cannot be connected with each other, and
wherein, when in the permitting state, the connector and the one end side of the communication cable can be connected with each other.

10. The peripheral device according to claim 1, wherein the activation completion information is outputted by being displayed on a display of the operational equipment when the installing unit is activated.

11. The method according to claim 7, wherein the activate completion information is outputted by being displayed on a display of the operational equipment when the installing unit is activated.

* * * * *